US 6,432,371 B1

(12) United States Patent
Oliver, Jr.

(10) Patent No.: US 6,432,371 B1
(45) Date of Patent: Aug. 13, 2002

(54) CHILD PROOF CHLORINE DISPENSER WITH A THREE DIMENSIONAL ORNAMENT

(76) Inventor: Jack Oliver, Jr., 2912 Knightbridge Rd., Columbia, SC (US) 29223

( * ) Notice: Subject to any disclaimer, the term of this patent is extended or adjusted under 35 U.S.C. 154(b) by 0 days.

(21) Appl. No.: 09/398,974

(22) Filed: Sep. 17, 1999

Related U.S. Application Data

(60) Provisional application No. 60/100,965, filed on Sep. 18, 1998.

(51) Int. Cl.⁷ .................................................. C02F 1/76
(52) U.S. Cl. ........................ 422/264; 422/265; 210/169; 210/242.1
(58) Field of Search ............................. 210/198.1, 169, 210/205, 242.1; 422/264, 265

(56) References Cited

U.S. PATENT DOCUMENTS

| | | | |
|---|---|---|---|
| 2,826,484 A | * 3/1958 | Buehler | |
| 3,598,536 A | * 8/1971 | Christensen | |
| 3,607,103 A | * 9/1971 | Kiefer | |
| D223,337 S | * 4/1972 | Kuchar | D9/218 |
| D224,401 S | * 7/1972 | Clinton | D23/3 |
| 3,677,711 A | * 7/1972 | Bond | |
| 3,684,460 A | * 8/1972 | Arneson | |
| 3,792,979 A | * 2/1974 | Clinton | 210/169 |
| 3,846,078 A | * 11/1974 | Brett | |
| D238,363 S | * 1/1976 | Polems | D23/3 |
| D252,337 S | * 7/1979 | Hehnen | D23/3 |
| 4,217,331 A | * 8/1980 | Schaub | 422/265 |
| 4,241,025 A | * 12/1980 | Grayson, IV et al. | 422/265 |
| D275,311 S | * 8/1984 | Wolfe | D23/3 |
| 4,473,533 A | * 9/1984 | Davey | 422/265 |
| 4,606,893 A | * 8/1986 | Sangster | 422/265 |
| D286,560 S | * 11/1986 | Wolfe | D23/3 |
| 4,630,634 A | * 12/1986 | Sasaki et al. | 422/265 |
| D288,227 S | * 2/1987 | Robinson | D23/3 |
| 4,643,881 A | * 2/1987 | Alexander et al. | 422/265 |
| D297,857 S | * 9/1988 | Alexander et al. | D23/207 |
| 4,798,707 A | * 1/1989 | Thomas et al. | 422/264 |
| 4,828,804 A | * 5/1989 | Nicholson et al. | 422/264 |
| 4,828,805 A | * 5/1989 | Connors | 422/264 |
| 4,876,003 A | * 10/1989 | Casberg | 210/169 |
| D309,493 S | * 7/1990 | Casberg | D23/208 |
| 5,053,205 A | * 10/1991 | Taylor et al. | 210/169 |
| 5,055,183 A | * 10/1991 | Buchan | 422/265 |
| 5,059,316 A | * 10/1991 | Renton | 422/265 |
| 5,433,867 A | * 7/1995 | Kisner | 210/169 |
| 5,662,795 A | * 9/1997 | Pickens et al. | 422/265 |

* cited by examiner

Primary Examiner—Robert J. Popovics
(74) Attorney, Agent, or Firm—Laurence L. Carnes

(57) ABSTRACT

A container apparatus comprising a hollow container body having a first end and a second end. The first end constitutes the top of the device while the second end constitutes the bottom of the device. A lid is removable from the second end. This removable lid will enable access to the interior of the container. This access will allow for items, such as chemicals, to be placed therein. Secured to the first end is a three dimensional ornamental. Punchable indentations are located along the encompassing side wall of the container body for allowing the container to act as a chlorinater when submerged in water and having the appropriate amount of holes punched.

16 Claims, 2 Drawing Sheets

CHILD PROOF CHLORINE DISPENSER WITH A THREE DIMENSIONAL ORNAMENT

This is an utility Patent Application for Provisionally File Application NO. 60/100,965 filed on Sep. 18, 1998.

BACKGROUND OF THE INVENTION

1. Field of the Invention

The present invention relates generally to a container apparatus and more particularly to a hollow container having opposite ends, wherein a first end includes a decorative and aesthetically pleasing three dimensional object and the second end includes a removable lid, and more particularly to a hollow container that is designed and configured to be floatable and to be used as a chlorinator, which are generally associated with pools, spas, and the like.

2. Description of the Prior Art

In the pool industry, maintaining a safe and pleasurable environment can be time consuming and tedious task. Due to the many concerns involved in maintaining comfortable and suitable water conditions, such as retaining uncontaminated pool water, devices have been developed to aid the pool owner in its endeavor of pool cleanliness.

One such device is a chlorinater which is a floatable apparatus comprising a lower container and a removable lid. This lower container maintains chlorine and includes a plurality of apertures. This design will enable the water from the pool to mix with the chlorine to provide for a solution of chlorine and water. This solution escapes via the apertures for retaining the cleanliness of the water. Though efficient, this device is not aesthetically pleasing. The consumer is limited to several unpleasant designs which may not go with the decor of the home. In addition, the top does not remove easily from the container, thereby providing an aggravating means for cleaning and refilling the container.

Accordingly, it is seen that there exists a need of providing an aesthetically and workable container device which is well suited for water use. The device should include a lid which is functional, ornate, decorative, and versatile so as to fit any decor of any pool side.

The previous efforts, as identified above, fail to provide the benefits intended with the present invention, such as providing a workable and functional apparatus suited for any decor. Additionally, prior techniques do not suggest the present inventive combination of component elements as disclosed and claimed herein. The present invention achieves its intended purposes, objectives and advantages over the prior art device through a new, useful and unobvious combination of component elements, which is simple to use, with the utilization of a minimum number of functioning parts, at a reasonable cost to manufacture, assemble, test and by employing only readily available material.

SUMMARY OF THE INVENTION

The present invention is a container apparatus that is ideally suited for use as a chlorinator, generally used in pools, spas and the like. This container of the present invention comprises a container body that is hollow and includes opposite ends.

Located on one end is a three dimensional ornamental object while located at the second end is a removable lid. This removable lid will enable access to the interior of the container. This access will allow for items, such as chemicals, to be placed therein. The container can be used as a storage means or optionally can be used as a chlorinator. To enable for the device to be used as a clorinator, the container body includes a means for allowing water to enter and exit the container so as to permit for the water to mix with the chemical substance therein. The mixture will be a solution that can escape via the particular means.

One means that has been utilized to produce favorable results is the use of indentations capable of being punctured. Once punctured, the indentations will form apertures that extend through the container. The number of indentations to be punctured is dependent upon the size and style of the particular pool, spa or the like. This means will optimize the performance and flow rate of the substance located within the container body.

Having an end with an ornamental structure provides for this end to be enclosed and to constitute an enclosed top end. The end that receives the lid constitutes the lower end, and thus is opened. This configuration will provide for the ornamental structure to be located above the water while the container will be located under the water. Thereby, providing for the ornamental structure to be visual when located in the desired body of water. Preferably, the container body and ornamental structure are a singular and integral structure.

This ornamental structure is designed and depicted so as to add interest and versatility to the overall product. Accordingly, this ornamental structure can represent any sporting event, such as, but not limited to collegiate, professional, or amateur football; collegiate, professional, or amateur basketball; collegiate, professional, or amateur baseball; collegiate, professional, or amateur hockey; collegiate, professional, or amateur soccer; collegiate, professional, or amateur auto racing; collegiate, professional, or amateur wrestling; collegiate, professional, or amateur golfing; animals; famous and well known figurines, characters, animated objects; or the like. By way of example, if the pool owner is a football fan, the top portion of the container could be shaped as a football or optionally as a helmet, sporting the name and logo of the owner's favorite team on the sidewall. This unique arrangement is unlimited in design structure by enabling any desirable structure to be located on the upper end of the container body.

Exteriorly located on the lower end of the container body is the attaching device used for attaching the lid to the container body. Once the lid is secured, a sealable attachment occurs between the container body and lid.

An added safety element is to provide for the lid to include a child-proof feature. This feature will prevent child from opening and/or tampering with the container, which may house dangerous and hazardous chemicals. Such a feature is a necessity and thus adds to the value of the overall product.

Accordingly, it is the object of the present invention to provide for a lid apparatus which will overcome the deficiencies, shortcomings, and drawbacks of prior container devices geared specifically towards housing a chemical substances or the like.

Still another object of the present invention is to provide for a container apparatus that is functional as well as aesthetically pleasing.

Yet another object of the present invention, to be specifically enumerated herein, is to provide a container apparatus in accordance with the preceding objects and which will conform to conventional forms of manufacture, be of simple construction and easy to use so as to provide a device that would be economically feasible, long lasting and relatively trouble free in operation.

Although there have been many inventions related to pool devices, none of the inventions have become sufficiently compact, low cost, and aesthetically pleasing to become commonly used. The present invention meets the requirements of the simplified design, compact size, low initial cost, low operating cost, ease of installation and maintainability, and minimal amount of training to successfully employ the invention.

The foregoing has outlined some of the more pertinent objects of the invention. These objects should be construed to be merely illustrative of some of the more prominent features and application of the intended invention. Many other beneficial results can be obtained by applying the disclosed invention in a different manner or modifying the invention within the scope of the disclosure. Accordingly, a fuller understanding of the invention may be had by referring to the detailed description of the preferred embodiments in addition to the scope of the invention defined by the claims taken in conjunction with the accompanying drawings.

BRIEF DESCRIPTION OF THE DRAWINGS

Similar reference numerals refer to similar parts throughout the several views of the drawings.

DESCRIPTION OF THE PREFERRED EMBODIMENTS

Figure 1:
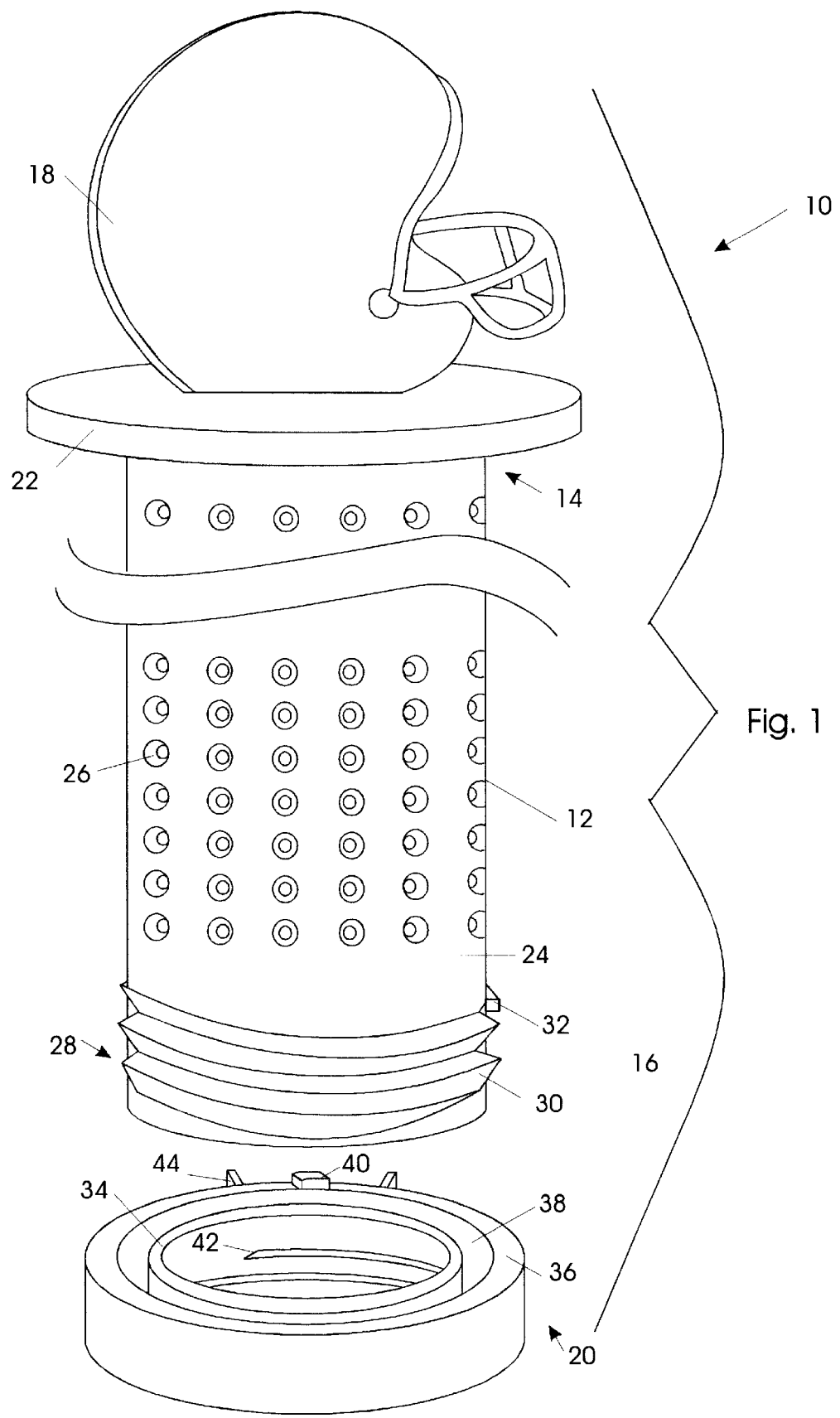
FIG. 1 is a perspective view of the container apparatus of the present invention.
Figure 2:
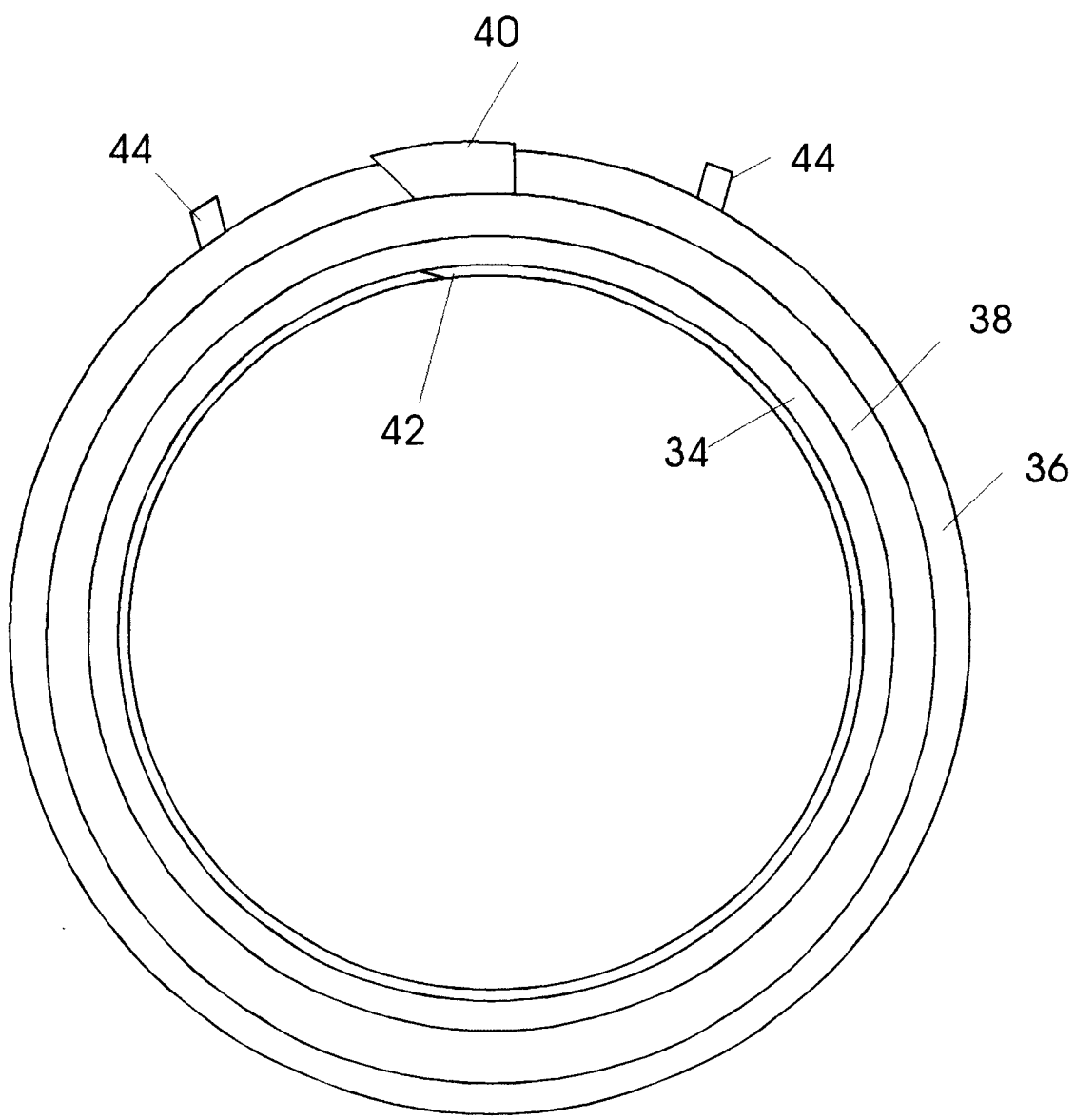
FIG. 2 is an enlarged top view of the lid used with the container apparatus of the present invention.

The present invention, shown in FIG. 1 and FIG. 2, is a container apparatus, generally denoted by reference numeral 10 and is designed and configured to be used in water, generally submerged in pools, spas and the like.

The object of the present invention is to provide for a container that functions adequately as well as provide for a product that is aesthetically pleasing. Ultimately providing for a device which is not obtrusive when in use. Preferably, the container apparatus 10 of the present invention can be used efficiently as a chlorinater.

As seen in the FIG. 1, the apparatus of the present invention 10 comprises a container 12 having a first end 14 and a second end 16. Located at the first end is an ornamental three-dimensional object 18 while removably secured to the second end is a removable lid 20. Preferably, the three-dimensional object 18 and the container 12 are an integral and singular structure. Since the device is specifically designed for use in water, its components, the lid 20 and container body 12 are fabricated from an anti-water corrosive material, such as plastic, polymer, plastic coated metal, or the like. This will allow for the apparatus of the present invention to be waterproof in order to provide for a final product that can withstand harsh weather conditions. The material that is to be utilized is also adapted to be exposed to chemicals, without corroding; since the apparatus of the present invention can optionally, and preferably, be used as a device for maintaining the cleanliness of a pools. As such, the interior of the container will be hollow to enable the hollow interior to have the capability of maintaining a chemical substance, such as chlorine or the like.

Ultimately, the final product will be buoyant. This will provide for the container body 12 to be located in the water. The ornamental object 18 is designed to be located above water when the apparatus is submerged in water. To aid in the buoyancy, the upper end 14 of the container 12 includes a base 22 and an upper structure that is the ornamental object 18. The base 22 extends outwardly and beyond both the container body 12 and the upper structure or the ornamental object 18. By way of example, as seen in FIG. 1, the upper structure is a football helmet. The purpose of the three dimension ornamental structure 18 is to add interest and versatility to the overall product. Accordingly, this ornamental structure can be any design or any form and thus represent any sporting event, such as, but not limited to collegiate, professional, or amateur football; collegiate, professional, or amateur basketball; collegiate, professional, or amateur baseball; collegiate, professional, or amateur hockey; collegiate, professional, or amateur soccer; collegiate, professional, or amateur auto racing; collegiate, professional, or amateur wrestling; collegiate, professional, or amateur golfing; animals; famous and well known figurines, characters, animated objects; or the like. By way of example, if the pool owner is a football fan, the top portion of the container could be shaped as a football or optionally as a helmet (as illustrated), sporting the name and logo of the owner's favorite team on the sidewall. This unique arrangement is unlimited in design structure by enabling any desirable structure to be located on the upper end of the container body.

The base 22 can also be decorated, as deemed appropriate. For example, if the ornamental object 18 is a football or a football helmet, then the top surface of the base can be design to depict a football field.

The container body 12 is hollow and its first end 14 constitutes the top end while its second end 16 constitutes the lower end. Forming the container body is an encompassing sidewall 24. Evenly spaced along the encompassing sidewall of the container body 12 is a plurality of indentations 26. These indentations extend partially through the sidewall so as to provide for thinned portion of the container body's sidewall 24. The thinned portions can easily be punctured by the user to provide for the punctured indentations to form holes. Dependent on the size of the pool and the size of the indentations will determine the amount of holes which will be formed. Under the various guidelines established by the pool industry, the number of holes formed will be determined by the area which is to be exposed to the chemical within the container.

In operation as a clorinator, since the hollow interior of the container body 12 will maintain a chemical substance, such as chlorine, the water will enter the interior via the formed holes. The water will mix with the chemical substance to form a solution. This solution will exit the unit via the formed apertures so as to provide a final product which will optimize the performance and flow rate of the substance located within the body.

Since the present invention is designed and configured to float in the water, the upper end or first end 14 will be exposed constantly. Due to this, the first end 14 will include the ornamental design 18 that will constantly be visual when floating around in the water. In addition, the second end 16 receives the lid 20. This second end in combination with the lid will include a unique feature by being childproof, and thus will prevent children opening the apparatus and prevent accidental exposure to the harsh tablets generally stored within the container.

As seen in the drawings, an attaching method 28 is used to attach the lid 20 to the second end 16. This attaching method, as seen, includes external threads 30 located exteriorly on the container body 12 and internal threads 42 are located within the lid. The external threads are adapted to receive the internal threads.

Extending outwardly from the lower end of the container body 12, and preferably above the threaded member 30 is a first flange or protrusion 32. This first flange is used for childproofing the apparatus of the present invention.

The lid 20 includes a unique design and is seen in further detail in FIGS. 1 and 2. As seen, this lid 20 includes an inner member 34 and an outer member 36. A gap 38 is located therebetween. As seen, the internal threads 42 are located within the inner member 34. Located on a portion of the outer member 36, is a second flange or protrusion 40.

The lid is made from a durable material that does possess some flexibility. Hence, the gap, in combination with the flexibility of the material will allow for the outer member to distort. When pressure is applied, the outer member will move inward.

In operation, the user threads the lid 20 to the lower end 16 of the container body 12. When the first flange 32 abuts the second flange 40, the user presses the outer member 36 inward. Due to the gap 38, the force from pressing will cause the outer member to distort and expand outward. This will provide for the second flange to extend away from the first flange and enable it to go pass the first flange. One past the first flange 32, the user releases the pressure and the lid returns to its original position. This will cause the first flange 32 to abut with the second flange 40. Upon rotation of the lid, the first flange acts as a stop and thus prevents the second flange from passing. Thereby, providing for a childproof lid. To remove the lid, the process identified above is reverse.

It is noted that the flanges 32 and 40 respectively can have an end that is tapered, as seen in FIG. 2. This will enable the lid to be place onto the container easily, while making removal more difficult. Thus, placing the lid on will provide for the second flange 40 to slide over the first flange 32. Once the second flange passes the first flange, the lid is in a locked position.

To aid in the pressing process, guides 44 can be located on the exterior of the outer member 36 of the lid 20. The user can place their thumb and index finger on top of or next to the respective guide. Once on or next to the respective guide, the user can press downward and turn accordingly. Optionally, an indication means can be located on the exterior of the lid, so as to remind the user to depress the lid for allowing proper operation.

Once the lid is secured, the contents of the container are sealed therein. To enhance the product, and to provide for a more water tight system, optionally, a gasket or seal (not illustrated), can be sandwiched between the open bottom 16 of the container the lid 20.

In order to utilize the present invention as a clorinator, the consumer punctures the appropriate number of indentations 26 as deemed necessary for his sized pool. The puncturing of the indentations will form holes. Any house hold tool, such as a screw driver, pen, or the like can be used to form the holes. Once the holes are formed the interior of the container 12 is exposed and the appropriate chemical substance is placed therein via the open bottom 16.

It is noted that this present invention need not be restricted to clorinators, but can also be used in other environments. The object in the present invention is to provide for a container that includes a top, which is constantly visible when submerged in water. The top includes the ornamental design. Chorine need not be the only substance that is to be placed within the container. Other objects, such as one's keys, sunglasses, suntan lotion, or the like can be located therein. In this environment, the container is used as a storage element. Additionally, this structure can be used for games, such as using the top end as a means for receiving rings during a game of ring toss. The possibilities of the container are endless, and the use of a childproof lid adds to the benefit of the final product.

It is further noted that the container need not be a hollow structure and that other types of containers can be used with the top end of the present invention. For example a thermostat can be substituted for the container while the top end is identical as discussed above. This will provide for the thermostat to include an ornamental design for the top end while the lower end, the thermostat, is used for continuous temperature reading.

While the invention has been particularly shown and described with reference to an embodiment thereof, it will be understood by those skilled in the art that various changes in form and detail may be made without departing from the spirit and scope of the invention.

I claim:

1. A container device comprising:
   a container having an enclosed top and an open bottom and being elongated;
   said container capable of holding a chemical substance used in pools;
   said container being fabricated from a material which is non-erosive when exposed to caustic material containing alkali or chlorine for forming a chemical solution;
   a lid is removably secured to said open bottom of said lower container;
   said enclosed top includes a three dimensional ornamental object attached thereto;
   said lid includes an inner member and an outer member;
   a gap is located between said inner member and said outer member;
   said lid is fabricated from a durable material that possesses some flexibility;
   a first attaching mechanism is located externally on a lower end of said container body;
   a mating attaching mechanism is located internally in said inner member of said lid; and
   a first device extending outwardly from said outer member and a second device extending outwardly from said lower end of said container body;
   said container and lid having a shape so as to provide for said container and lid to be buoyant so that when placed in water the water that is displaced is equal to the weight of said container and its contents and having a lid thereon;
   said first device and said second device constituting said child proof mechanism; and
   wherein attachment occurs when said first attaching mechanism is secured to said mating attaching mechanism for enabling said first attaching mechanism to mate with said mating attaching mechanism, when said first device contacts said second device, said outer member is pressed causing said outer member to distort and expand thereby enabling said second device to extend away from said first device and enable passage and thus allow for attachment of said lid to said container.

2. A container device as in claim 1 wherein a gasket is located between said open bottom and said lid.

3. A container device as in claim 1 wherein said container body includes a plurality of indentations that can be punched out to form holes.

4. A container device as in claim 1 wherein said ornamental structure is a football helmet.

5. A container device as in claim 1 wherein said container body is fabricated from plastic.

6. A container device as in claim 1 wherein said three dimensional ornamental structure further includes a base sandwiched between said upper end and said three dimensional ornamental structure and said base extends outwardly and beyond said three dimensional ornamental structure.

7. A container device as in claim 6 wherein said ornamental structure is a football helmet.

8. A container device as in claim 6 wherein said first attaching mechanism comprises external threads and said external threads are located on said lower end of said container body, said mating attaching mechanism comprises internal threads and said internal threads are located in said inner member of said lid, said first device is a first flange and said first flange extends outwardly from said outer member and said second device is a second flange and said second flange extends outwardly from said lower end of said container body.

9. A container device as in claim 8 wherein guides are secured exteriorly to said outer member.

10. A container device as in claim 9 wherein said first flange includes an end which is tapered.

11. A container device as in claim 10 wherein said second flange includes an end which is tapered.

12. A container device as in claim 1 wherein said first attaching mechanism comprises external threads and said external threads are located on said lower end of said container body, said mating attaching mechanism comprises internal threads and said internal threads are located in said inner member of said lid, said first device is a first flange and said first flange extends outwardly from said outer member and said second device is a second flange and said second flange extends outwardly from said lower end of said container body.

13. A container device as in claim 12 wherein guides are secured exteriorly to said outer member.

14. A container device as in claim 12 wherein said first flange includes an end which is tapered.

15. A container device as in claim 14 wherein said second flange includes an end which is tapered.

16. A container device as in claim 1 wherein said container and said three-dimensional ornamental are an integral structure.

* * * * *